March 24, 1970   J. S. PAWLINA ETAL   3,502,184
CLUTCH

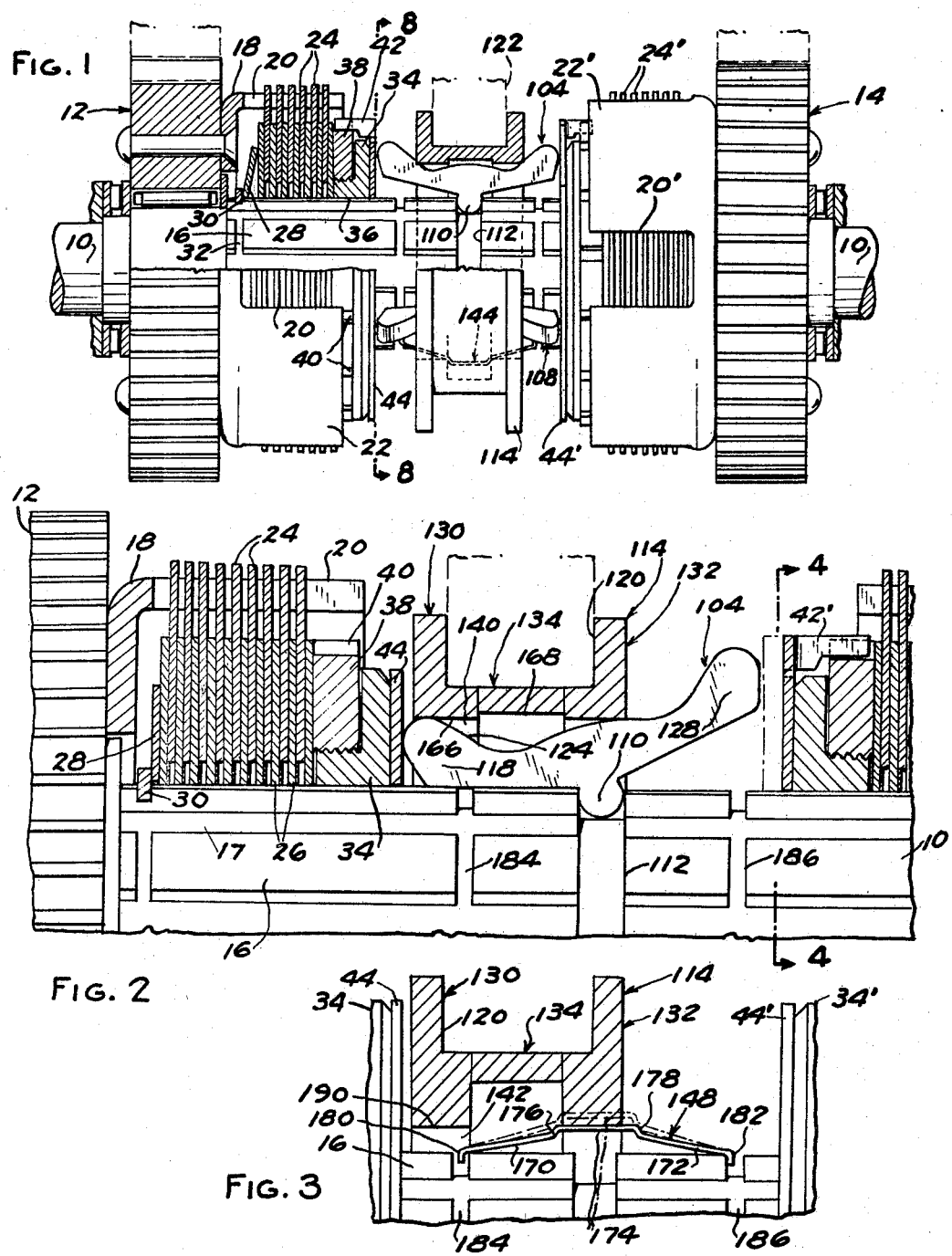

Filed June 13, 1968   3 Sheets-Sheet 2

INVENTORS
JULIAN S. PAWLINA
JANIS TENISONS
BY

ATTORNEYS

March 24, 1970　　　J. S. PAWLINA ET AL　　　3,502,184
CLUTCH

Filed June 13, 1968　　　　　　　　　　　　　　　3 Sheets-Sheet 3

INVENTORS
JULIAN S. PAWLINA
JANIS TENISONS
BY

ATTORNEYS

United States Patent Office 3,502,184
Patented Mar. 24, 1970

3,502,184
CLUTCH
Julian S. Pawlina, Elkhart, Ind., and Janis Tenisons, Edwardsburg, Mich., assignors to Tecumseh Products Company, Tecumseh, Mich., a corporation of Michigan
Filed June 13, 1968, Ser. No. 736,647
Int. Cl. F16d 21/02
U.S. Cl. 192—48.91   9 Claims

ABSTRACT OF THE DISCLOSURE

A friction clutch incorporating a shift spool fabricated from sheet metal stampings and adapted to rock a plurality of levers to develop clamping pressure against interleaved sets of friction discs connected to rotary members to couple driven and driving parts through the clutch. The levers pivot on a rounded projection engaged in a groove in one of the rotary members. A novel detent spring arrangement cooperates with the shift spool to maintain the shift spool in neutral position. The clutch also includes a pressure plate and lock spring member for holding a wear take up nut in adjusted position. The lock spring and nut are adapted to cooperate with a special adjusting tool also disclosed herein.

---

An object of the present invention is to provide an improved clutch of the aforementioned type which is economical to manufacture and convenient to service.

Other objects, features and advantages of the present invention will become apparent from the following detailed description taken in conjunction with the accompanying drawings wherein:

FIG. 1 is an elevational view of an improved clutch construction of the present invention showing a dual arrangement of clutches which may be used to effect changes in speed or reversal in rotation of a driven member, the upper half of the left hand clutch being shown in vertical center section and both clutches being shown in their disengaged positions.

FIG. 2 is a fragmentary elevational view taken partially in vertical center section on a larger scale than FIG. 1 illustrating the left hand clutch in its engaged position and the right hand clutch in its disengaged position.

FIG. 3 is a fragmentary elevational view taken in vertical section through the shift ring illustrating the action of one of the detent springs of the clutch.

Figures 4, 5, 6, 7:
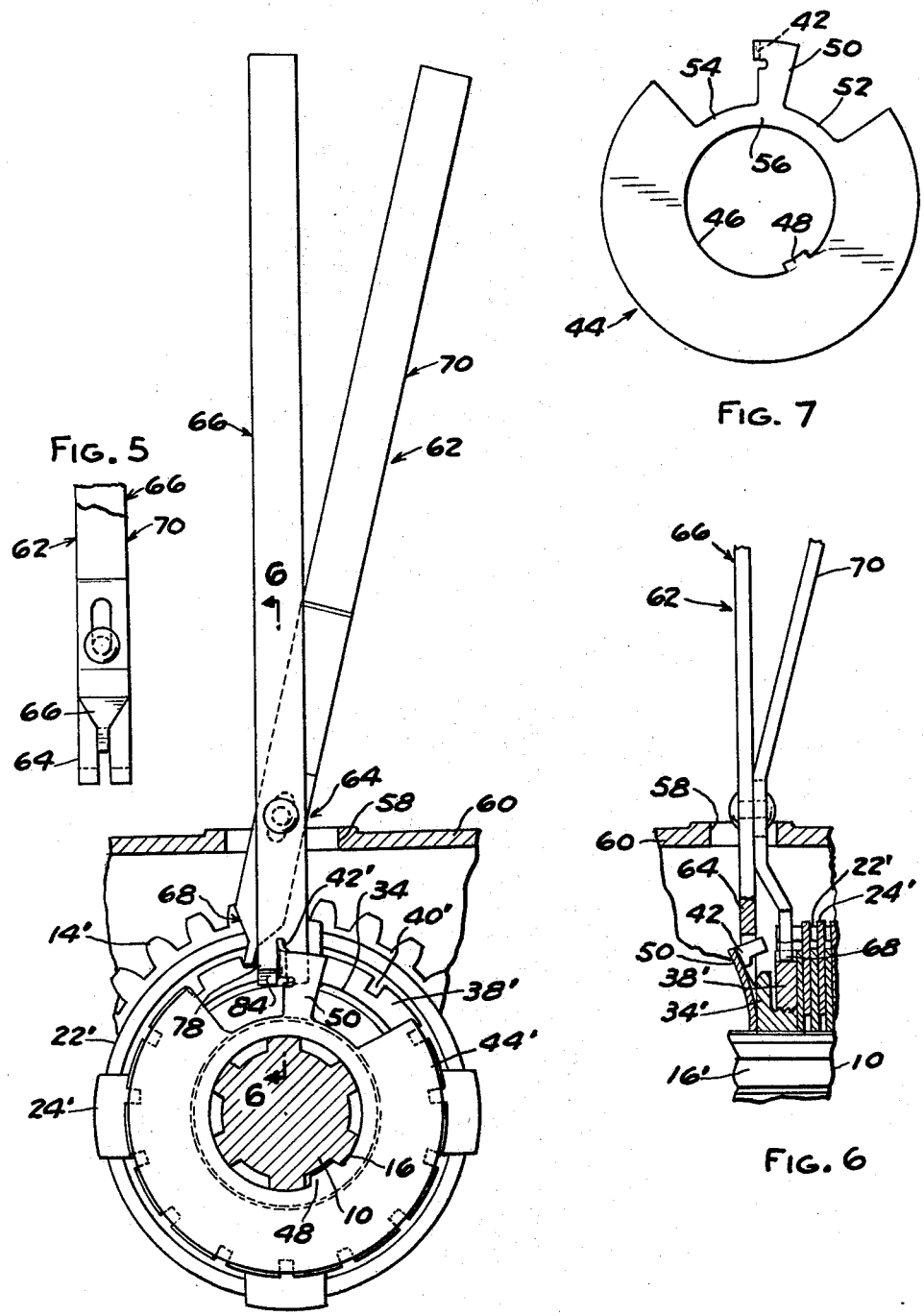
FIG. 4 is a vertical section taken on the line 4—4 of FIG. 2 and further illustrating a novel adjusting tool cooperable with a detent pressure plate to facilitate wear take up adjustment of the clutch.
FIG. 5 is a fragmentary side of elevational view of the adjusting tool of FIG. 4 illustrating the reverse side thereof.
FIG. 6 is a vertical section on the line 6—6 of FIG. 4.
FIG. 7 is a side view of the combined pressure plate and detent member shown by itself.
Figure 8:
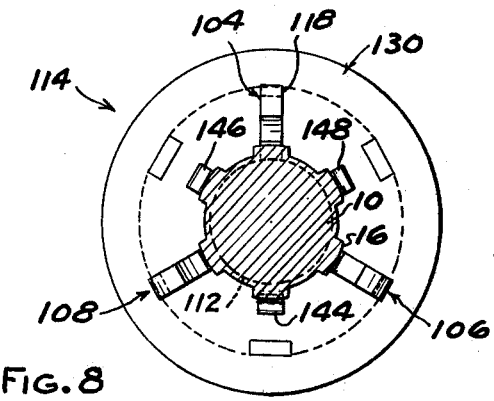
FIG. 8 is a vertical section taken on the line 8—8 of FIG. 1.

The dual clutch illustrated in the drawings is somewhat similar to and is an improvement over that disclosed in United States Patent 3,333,661 and may be used as a forward-reverse friction disc clutch in a transmission of a motor driven hand guided tractor or the like. Referring to FIG. 1, the clutch assembly is supported on a shaft 10 constituting one of the rotary parts of a transmission which, for purposes of illustration, constitutes the driven member of the clutch construction. A pair of clutch gears 12 and 14 are journalled on shaft 10 by suitable bearings for rotation relative to the shaft. Gears 12 and 14 are or may be continuously driven rotatably in opposite directions by a drive shaft and its associated gears when the clutch is used as a forward-reverse clutch in the transmission.

A series of axially extending splines 16 are formed on shaft 10 and a pair of identical friction disc clutches are mounted thereon, one adjacent each of the gears 12 and 14. Since the friction disc clutches are identical, only one will be described, reference hereinafter being made to the left hand clutch as viewed in FIGS. 1 and 2.

A sheet metal cup 18 is riveted to gear 12 and has a series of four notches 20 alternating circumferentially with fingers 22 which extend axially from the base of the cup toward the opposite clutch. Each slot 20 receives therein the keying projection of a plurality of driving friction discs 24. Discs 24 thus are keyed for rotation with gear 12 but are centrally apertured for free rotation and axial movement relative to shaft 10. A plurality of driven friction discs 26 are interleaved with discs 24 and are keyed to spline 16 of shaft 10 to impart rotation thereto. Discs 26 are likewise axially movable on shaft splines 16. Movement of the disc axially to the left as viewed in FIG. 1 is limited by a Belleville washer type backing plate 28 which is restrained by a snap ring 30 received in a circumferential groove 32 in splines 16.

A pressure ring 34 having a splined center opening 36 is received on splines 16 for axial sliding movement along the shaft but for keyed rotary engagement therewith adjacent the innermost disc of the set. An adjusting ring 38 is threadably carried on pressure ring 34. Ring 38 may be rotated to move it axially relative to pressure ring 34 to compensate for frictional wear of the disc and ring. The periphery of ring 38 has a series of equally spaced notches 40 (FIG. 4) one of which receives an axially extending finger 42 of a combination locking ring and pressure plate 44 best seen in FIGS. 4 and 7. Plate 44 has a circular center aperture 46 with a single internal tooth 48 which is received between a pair of adjacent splines 16 to key plate 44 for rotation with shaft 10 but which permits axial sliding movement of plate 44 relative to the shaft. The engagement of finger 42 with adjusting ring 38 prevents rotation of ring 38 relative to shaft 10 and hence relative to pressure ring 34 to thereby hold the threaded adjustment of ring 38 on ring 34. Finger 42 extends at right angles to an arm 50 adjacent the radially outer end thereof, arm 50 being separated from the remainder of plate 44 by notches 52 and 54 blanked out of the plate. Arm 50 tapers inwardly toward its junction with an inner rim portion 56 of plate 44 to form a resilient hinge connection therewith so that finger 42 may be pivoted from the position shown in FIG. 1, to which it is normally biased by arm 50, to a position as illustrated in FIGS. 4 and 6 wherein finger 42 is disengaged from notch 40.

Resiliently yieldable locking finger 42, pressure ring 34, and adjusting ring 38 provide a readily adjustable means of compensating for wear in clutch discs 24, 26. A hole 58 in transmission case 60 provides access to the locking finger and adjusting ring so that they can be manipulated either by screwdrivers of the like or by a special adjustment tool 62 (shown in FIGS. 4, 5 and 6). Tool 62 is more fully disclosed and claimed in a co-pending the United States patent application of the assignee herein.

The working end 64 of arm 66 of tool 62 is manipulated to disengage locking finger 42 and the working end 68 of arm 70 of tool 62 is inserted in notches 40 and manipulated to rotate threaded adjusting ring 38.

The left and right hand sets of friction discs are selectively engaged and disengaged relative to one another by a set of three generally V-shaped levers 104, 106 and 108. Each lever 104, 106 and 108 has a rounded projection 110 on its underside at its vertex which rides in a circumferential center groove 112 which is formed in spline 16 and recessed below the face of the spline grooves to thereby fulcrum each lever on the shaft for rocking movement as indicated by comparing FIGS. 1 and 2. Levers 104, 106 and 108 are captured by a shift ring or a collar 114 which has a spline engagement with splines 16 and is notched to slip endwise axially over the levers when they are rocked to their FIG. 2 position wherein all left hand arms 118 have been retracted flat against spline 16. Ring 114 has a circumferentially extending center groove 120 in its outer periphery which slidably receives a conventional shift yoke 122 (shown in broken lines in FIGS. 1 and 2) which is adapted for operable connection to a clutch control mechanism (not shown) in a known manner. Outer edges 124 of levers 104, 106 and 108 are suitably contoured as shown in the drawings to slidably contact, the root wall of the grooves in the spool so that a smooth, positive rocking action is imparted to the levers in response to axial sliding movement of the spool.

The operation of the clutch described above is similar to that disclosed in the aforementioned Patent 3,333,661 and hence will not be repeated in detail herein. Suffice it to say that when spool 114 is shifted from the neutral center position shown in FIG. 1 axially to the left as viewed in FIG. 2, the levers will be rocked to bring the outer ends of left hand arms 118 against left hand pressure plate 44, thereby pushing pressure ring 34 towards hand discs 24 and 26 so that they frictionally engage to couple shaft 10 to gear 12. At the same time the opposite arms 128 of the levers are pivoted away from right hand pressure plate 44' further insuring that the right hand friction discs are free of engagement and able to slip. Movement of spool 114 in the opposite direction rocks the levers clockwise into the neutral position of FIG. 1, and further movement of the spool towards the right rocks right hand arms 128 of the levers down into pressure engagement with plate 44' to engage the right hand friction discs, thereby coupling gear 14 to shaft 10.

Preferably plates 44 and 44' are made of a Swedish austempered steel which is well adapted to withstand the resilient bending of the arm 50 during repeated take up adjustments as well as to take the sliding wear of the lever arms, and which is readily cold formed.

In accordance with the present invention, spool 114 is constructed from a plurality of stamped sheet metal parts for economy of manufacture and to provide the high strength of steel in the assembly. Referring in detail to FIGS. 8–12 inclusive, spool 114 is made up of three pieces; two identical end plates 130, 132 and a center hoop or ring 134. Plates 130, 132 each have a generally circular center aperture defined by six radially inwardly projecting portions 136 which register with spaces 17 between splines 16 on shaft 10, and alternating therewith a series of notches 138 adapted to receive splines 16 therein. Three large radial notches 140 are provided at 120° intervals which register with levers 104, 106 and 108. Circumferentially alternating between notches 140 are three somewhat shorter radial notches 142 at 120° intervals which individually register with three bow-shaped detent springs 144, 146 and 148 described subsequently. Plate 130 also has three rectangular openings 150 radially aligned with shorter notches 142 and spaced radially outwardly therefrom.

Figure 9:
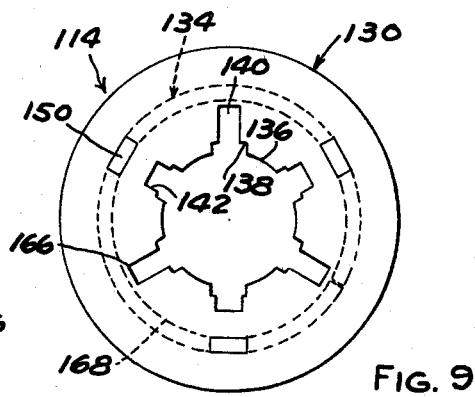
FIG. 9 is an elevational view showing the outer side of one of the end plate members of the shift spool assembly.
Figure 10:
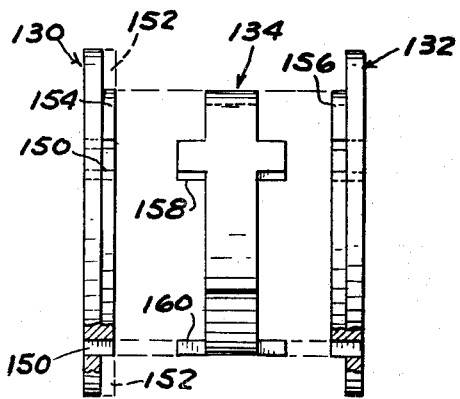
FIG. 10 is an elevational exploded view of the three parts of the shift spool prior to assembly.

Referring to FIG. 10, plate 130 may be initially stamped or blanked with the aforementioned openings as shown in FIG. 9 from a cylindrical blank of uniform thickness so as to include the annular portion 152 indicated in broken lines in FIG. 10. Portion 152 after the blanking is removed by machining to form a smaller diameter hub portion 154 having the same diameter as the center hoop 134. The same procedure can be applied to end plate 132 to form a similar hub portion 156 on its inner face. Machining away portion 152 exposes rectangular through hole 150 and thus it appears in FIG. 10 as a slot where it extends through hub portion 154. However, it is to be understood that such machining preferably is not done until after parts 130, 132 and 134 have been staked together and furnace brazed.

Figure 11:
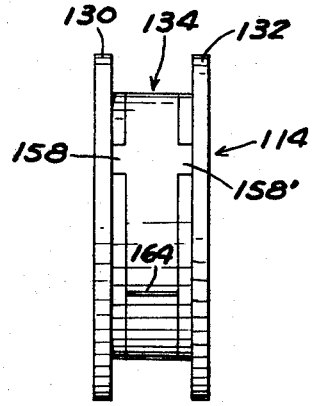
FIG. 11 is an elevational view of the spool parts in assembled relation.
Figure 12:
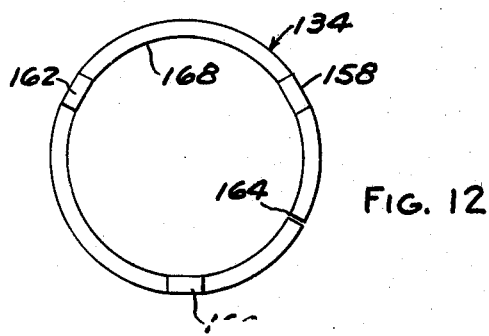
FIG. 12 is an end elevational view of the center member of the shift spool assembly.

Center piece 134 is blanked from a flat strip to form a band with three ears or tabs 158, 160 and 162 projecting from each longitudinal edge of the strip. The strip is then formed into a hoop as shown in FIGS. 10 and 12 and brazed at 164 where its ends abut. Ears 158, 160 and 162 and the corresponding ears along the other edge of strip 134 are dimensioned to be received in openings 150 as indicated in FIGS. 10 and 11. The three parts are held in assembled relation by staking the outer ends of the ears and brazing the ears to the end plates.

Referring again to FIGS. 1, 2 and 3, spool 114 has a splined registration with spline 16 in groove 17 of shaft 10 so that it can slide axially on the shaft but is keyed thereto for rotation therewith. Thus each of the levers 104, 106 and 108 is captured radially and circumferentially in its associated slot 140 formed in end plates 130, 132 of spool 114. Each lever is captured against axial movement by the rounded protuberance 110 riding in circumferential groove 112 of shaft 10. Upper surface 124 of each lever is contoured so that it has a sliding camming engagement at all times with a portion of top wall surfaces 166 of slots 140 in end plates 130, 132. This engagement is such that as surfaces 166 move farther out toward one end of the lever a greater mechanical advantage is obtained. When the lever is rocked all the way down to the FIG. 2 position, the mechanical advantage is so high that the reaction forces exerted by pressure plate 44 on the lever do not develop a significant axial component on spool 114 and hence the spool is readily maintained in the engaged position of FIG. 2. Upper surface 124 of each lever is also contoured so that spool 114 regardless of its axial position always retains rounded projections 110 in groove 112. Hence this arrangement does not require a resilient retainer ring. It will be noted that inner surface 168 of center hoop 134 has a greater diameter than surfaces 166 of slots 140 and hence surface 168 is spaced clear of engagement with levers 104, 106 and 108.

Detent springs 144, 146 and 148 are generally bow-type leaf springs as best seen in FIG. 3 and comprise arms 170 and 172 which diverge from an offset straight center portion 174. The arms are joined to the center portion by short, more sharply angled legs 176 and 178. The outer ends of the arms are bent to extend parallel to one another to form tips 180 and 182 which project into circumferential grooves 184 and 186 respectively which are in turn formed in splines 16 at equal distances from center groove 112. Springs 144, 146 and 148 are captured by slots 142 in spool 114 as best seen in FIG. 3. The center portion 174 of each spring is dimensioned to register with the space between plates 130 and 132 and legs 176 and 178 engage the inner edges of the plate walls radially outwardly of the root walls 190 of slots 142 when spool 114 is centered between the left and right clutches as shown in FIG. 1. In this position springs 144, 146 and 148 thus yieldably maintains spool 114 in the central, neutral position. When spool 114 is initially shifted out of the neutral position the forward edge of trailing slot 142 cams against the associated spring portion 176 or 178 to bow each spring from the broken line to the solid position indicated in FIG. 3. The root wall 190 bears down against and compresses the associated spring as the spool is further shifted toward engagement position.

What is claimed is:

1. In a friction clutch having interleaved sets of friction discs respectively connectable to input and output rotary members and axially movable relative to one another for frictional torque transmitting interengagement and a clamping means for urging said discs into said engagement, the combination therewith which includes:
   (a) in one of said rotary members a circumferential groove,
   (b) a plurality of generally V-shaped levers each having a generally rounded protrusion at the vertex thereof rockably seated in said groove and a cam surface generally opposite said rounded protrusion, and
   (c) shift means operably engaging at least a portion of said cam surfaces of said levers to retain said rounded protrusions in said groove and to pivot said lever means about said protrusion in said groove in response to movement of said shift means axially of said one rotary member, said levers being adapted to bear at one end thereof remote from said rounded protrusion against said clamping means when said one end is pivoted toward said one rotary member by axial movement of said shift means toward said remote end.

2. The improvement as defined in claim 1 in which said shift means includes a spool circumferentially overlying said levers and engaging at least a portion of said cam surface of each of said levers.

3. The improvement as defined in claim 2 in which said spool includes:
   (a) two generally flat end plates in opposed spaced coaxial relationship,
   (b) said plates each further having (1) a generally circular center aperture, (2) a plurality of outwardly extending circumferentially spaced slots opening into said aperture with each of said slots having an end portion overlying and engaging with a portion of said cam surface and (3) a plurality of circumferentially spaced openings radially outwardly of said ends of said slots,
   (c) a circular hoop interposed between and engaging the mutually facing sides of said plates, said hoop having a plurality of axially extending tabs extending into said openings in said plates, and
   (d) means connecting said tabs to said plates.

4. In a twin-disc clutch having a hub, sets of clutching discs spaced axially apart on said hub, clamping plates axially movable for frictionally interengaging said discs and clutch actuating means on said hub intermediate said plates for selective actuation of either of said disc sets via the respectively adjacent plate, the improvement wherein said clutch actuating means includes:
   (a) in said hub a circumferential groove intermediate said plates,
   (b) a plurality of generally V-shaped levers each having a generally rounded protrusion at its vertex extending into and engaging with said groove and a cam surface generally opposite said protrusion,
   (c) a spool overlying said levers and encircling said hub and engaging at least a portion of said cam surface of each of said levers, said spool retaining each of said rounded protrusions in said groove and being shiftable axially of said hub while slidably engaging said cam surfaces of said levers to thereby pivot said levers in said grooves about a fulcrum point defined by the engagement of said rounded protrusions in said groove, whereby said levers are selectively engageable with said clamping plates to frictionally interengage the associated disc set.

5. In a friction clutch having interleaved sets of friction discs respectively connectable to input and output rotary members and axially movable relative to one another for frictional torque transmitting interengagement, clamping means for urging said discs into said engagement, and pivotal lever arms positioned to pivot into engagement with said clamping means to cause said clamping means to urge said discs into said interengagement, the combination therewith of a spool overlying and engaging said lever arms to so pivot said lever arms in response to axial movement of said spool from a clutch-disengaged to a clutch-engaged position which includes:
   (a) two generally flat spaced parallel plates each having an opening therein forming surfaces engaging a portion of each of said levers, each of said plates also having a plurality of tab openings spaced circumferentially on each plate,
   (b) a circular hoop interposed between and engaging said plates, said hoop having a plurality of generally axially extending tabs engaging in said tab openings, and
   (c) means connecting said tabs to the associated plates to thereby connect said hoop to each of said plates.

6. The combination set forth in claim 5 wherein each of said plates has a plurality of radially inwardly extending slots each forming one of said surfaces engaging a portion of one of said levers.

7. The combination set forth in claim 5 wherein said plates are formed with said tab openings and said slots as metal stampings and said hoop is formed with said tabs as a metal stamping.

8. In a frictional clutch having interleaved sets of friction discs respectively connectable to input and output rotary members and axially movable relative to one another for frictional torque transmitting interengagement, and a clamping means for urging said discs into said engagement, said clamping means including a pressure ring engaging and axially displaceable on one of said members to clamp said sets of discs into frictional engagement, an adjusting ring carried on said pressure ring and being axially adjustable relative thereto to compensate for wear of said discs, said adjusting ring having at least one detent receptacle, and a pressure plate disposed adjacent said pressure ring and having movable detent means resiliently biased into engagement with said detent receptacle to selectively prevent axial displacement of said adjusting ring with respect to said pressure ring, whereby said detent means can be displaced to allow axial displacement of said adjusting ring and when released it will be resiliently biased into engagement with said detent receptacle thereby resisting further axial displacement of said adjusting ring with respect to said pressure ring, said adjusting ring comprising a nut threadedly connected to said pressure ring and having a plurality of circumferentially spaced notches defining said detent receptacles, said nut being axially displaceable on said pressure ring by rotation of said nut relative to said pressure ring, said pressure plate comprising a spring steel plate and said detent means comprising a resiliently yieldable finger integral with said plate and projecting therefrom to normally selectively engage in one of said notches, said clamping means including rockable levers each having one end movable into sliding pressure engagement with said pressure plate, and said pressure plate comprising a flat annulus with a center opening receiving said one member coaxially therethrough and configurated to have a keying engagement with said one member to prevent relative rotation between said plate and one member while permitting relative axial movement thereof, said finger having a radially outwardly extending portion defined by circumferentially spaced notches in the outer periphery of said annulus and having a free end portion extending axially from said outer end of said radially extending portion adapted to register with the selected notch of said adjusting ring.

9. In a friction clutch having interleaved sets of friction discs respectively connectable to input and output rotary members and axially movable relative to one another for frictional torque transmitting interengagement, clamping means for urging said discs into said engagement, and pivotal lever arms positioned to pivot into engagement with said clamping means to cause said clamping means to urge said discs into said interengagement, the combination therewith of a spool overlying and engaging said lever arms to so pivot said lever arms in response to axial movement of said spool from a clutch-disengaged to a clutch-engaged position which includes:
(a) two generally flat spaced parallel plates each having an opening therein forming surfaces engaging a portion of each of said levers,
(b) a circular hoop interposed between and engaging said plates, said hoop and said plates defining an internal circumferential groove in said spool, the one of said plates remote from said discs having a notch in its inner periphery leading into said groove with the bottom surface of said notch spaced radially inwardly of the spool from the bottom surface of said groove,
(c) means connecting said hoop to each of said plates,
(d) a bow type leaf spring having a raised center portion adapted to resiliently engage with said groove in the clutch-disengaged position of said spool and being deflectable radially inwardly of said spool to register with said notch in response to axial movement of said spool toward said discs to said clutch-engaged position of said spool, and
(e) means restraining the ends of said spring against radial and axial movement thereof whereby said spring yieldably retains said spool in its clutch-disengaged position.

References Cited
UNITED STATES PATENTS

| | | | |
|---|---|---|---|
| 1,924,108 | 8/1933 | Conway | 192—70.24 X |
| 2,140,619 | 12/1938 | Dunkelow. | |
| 2,333,037 | 10/1943 | Osborn | 192—48.9 X |
| 2,684,740 | 7/1954 | Mader. | |
| 2,884,105 | 4/1959 | Tomlinson. | |
| 3,333,661 | 8/1967 | Pawlina et al. | |

BENJAMIN W. WYCHE III, Primary Examiner

U.S. Cl. X.R.

74—527; 192—70.24, 93, 111, 114; 242—118.61